United States Patent Office 3,817,767
Patented June 18, 1974

3,817,767
CEMENTITIOUS COMPOSITIONS
Keith B. Bozer, Crystal Lake, Ill., and Ronald H. Cooper, Clare, Mich., assignors to The Dow Chemical Company, Midland, Mich.
No Drawing. Continuation-in-part of application Ser. No. 825,926, May 19, 1969, which is a continuation-in-part of applications Ser. No. 711,790, Mar. 8, 1968, and Ser. No. 761,284, Sept. 30, 1968, which in turn is a continuation-in-part of application Ser. No. 605,569, Dec. 29, 1966, all now abandoned. This application Sept. 14, 1972, Ser. No. 289,006
Int. Cl. C04b 7/02, 7/32, 9/02
U.S. Cl. 106—90
7 Claims

ABSTRACT OF THE DISCLOSURE

An improved cementitious composition curable by hydration and having enhanced properties, such as less water absorbency and greater strength, comprises a cementitious material and a small but effective amount of alkenyl substituted succinic acid or anhydride.

RELATIONSHIP TO RELATED APPLICATIONS

The present specification and claims are a continuation-in-part of co-pending application Ser. No. 825,926 filed May 19, 1969, now abandoned, which was a continuation-in-part of application Ser. No. 711,790, filed Mar. 8, 1968, now abandoned; and of co-pending application Ser. No. 761,284 filed Sept. 30, 1968, now abandoned, which, in turn, was a continuation-in-part of earlier co-pending application Ser. No. 605,569, filed Dec. 29, 1966, and now abandoned.

BACKGROUND OF THE INVENTION

Cementitious materials have long been used both as a structural material and as a binder. Chief among those materials are the hydraulic cements. The term, hydraulic cement, as used herein, means one which, when admixed with water (or brine) sets to a solid mass. Portland, aluminous, and pozzolan cements and mortar, lime, slag and high aluminosulfate expensive cements are illustrative of hydraulic cements. Portland cement is by far the most widely used and reference thereto may be made herein as generally illustrative of the hydraulic cements.

Hydraulic cement is used by admixing it with water or an aqueous solution to make a slurry which is emplaced as desired in a space or void or within confining forms and which thereafter sets to a solid mass through a process of hydration which proceeds chiefly by forming a high strength matrix of interlocking crystals. When the aqueous slurry consists essentially of only the cement and water or aqueous liquid (e.g. a brine) when set, it is known as neat cement but when such slurry contains sand and optionally other modifiers, it is known as mortar and when it contains gravel as well as sand, the set mass is known as concrete.

Among the many uses of hydraulic cement compositions is that requiring the slurry to set in water or brine or in a high humidity atmosphere wherein resistance to excessive absorption of water by the cement composition is important if the set cement is to have a long life. It has been well established that the greater the resistance to absorption of water and to aqueous solutions of salts, such as are encountered in the form of deicing materials, the longer the life of the concrete or cement. Scaling, spalling, pitting, cracking, and other indications of degradation of the concrete or set cement are greatly accelerated by the amount of water or brine, or of moisture from the air which is absorbed, e.g. during alternate freeze-thaw and wet-dry conditions. Such uses include the construction of highways, bridges, docks, wharfs, pillars and supports therefor, curbs, sidewalks, dams, ramps, tunnel and shaft liners, barges and decks therefor, footings and foundations, retaining walls, and masonry structures of various types.

In addition, it has long been known to improve the strength of earth soil for bearing weight by mixing Portland cement or lime with the soil under such conditions that the cement or lime hydrates and "sets." The resulting soil, while not a building material comparable with Portland cement concrete, typically has load-bearing and other properties adapted to engineering uses much improved over unmodified earth soil. Such modification of soil in connection with construction has become a standard practice, available to the construction engineer when needed.

THE PRIOR ART

The inventors know of no prior art that they deem significant. U.S. Pat. 2,770,077 is concerned with the use of an alkenyl succinic compound in conditioning soil for agricultural use.

U.S. Pat. 3,335,018 is concerned with soil stabilization, and is directed to a mixture of an alkali metal silicate, a lower alkanoic acid amide, and an hydraulic cement such as portland cement in soil, the said mixture being taught to confer stabilization properties upon the soil superior to those of the hydraulic cement alone.

U.S. Pat. 3,202,521 teaches the use of sodium dioctyl sulfosuccinate as an additive to a mixture of portland cement, water, and aggregate as an air detraining agent, useful to control the amount of entrained air retained within a mixed concrete.

U.S. Pat. 3,131,074 is concerned with mechanical stabilization of soils of unusually fine granular structure, and teaches the modification of soil stabilization by addition to the soil of a proportion of any of several proteins together with any of several substantially basic materials such as portland cement or an alkali earth metal hydroxide.

U.S. Pat. 3,086,043 is concerned with certain hydroxy polyalkeneoxyalkane sulfonate derivatives of alkenyl succinic anhydrides, substances which are stated to have exceptional surface active properties as detergents, wetting agents, and lathering agents.

U.S. Pat. 2,790,724 is concerned with cements especially intended for well treatment that have extended thickening times, that is to say, times of duration extended beyond normal required for the cement to change from a mobile slurry to an immobile solid. This change in thickening time is accomplished by the addition of a polyalkylene succinic anhydride, polyalkoxyalkylene succinic anhydride and certain related substances.

U.S. Pat. 2,491,045 is concerned with the stabilization of soil, and involves the modification of the conventional portland cement stabilization of soil by incorporation with it of an amount of a pine wood extractive resin.

SUMMARY OF THE INVENTION

When a composition containing a cementitious material is modified, by the inclusion, in the chemical composition of the material, of an active amount of an alkenyl succinic acid compounds as herein defined, the structural properties of the material are improved, as to ability to withstand various degradative effects, notably those involving intrusion or migration of water, or formation or growth of ice crystals. Improved ability to withstand other degradative effects is also noted when corresponding degradative influences are present, including ability to withstand weathering, and notably weathering that is enhanced by the presence, in atmosphere, rain, and the like, of mineral acid anhydrides in exalted amounts, that is to say, in amounts made greater than normal as a result of combustion of carbon, sulfur, phosphorus, and so forth. Improved ability to withstand other degradative influences is noted, as well, including the withstanding of various germicides in mop waters, and the like.

This improvement of properties, while uniformly occurring throughout the scope of this invention, oftentimes takes different apparent forms in different environments.

The hydraulic cement is understood to include the portland cements in the conventional and commercial sense, and may be of any of the standard cement types I, II, III, IV, or V (which are sometimes designated by the corresponding Arabic numerals). Also comprehended in the instant hydraulic cements are the aluminous cements, the pozzolan cements, the mortars, lime, plaster, Plaster-of-Paris, and its special forms containing wood flour and sometimes called "water putty"; slag cements and the expansive cements of high aluminosulfate content.

"Lime" as employed in the instant specification and claims is a calcium oxide or hydroxide form susceptible of hydration from finely powdered form, with water, whereby it sets and hardens from a loose powder to a continuous solid: and Plaster-of-Paris is the calcium sulfate with similar properties of hydration.

The active agent is an alkenyl succinic anhydride of the formula

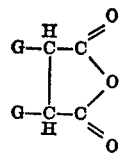

or an alkenyl succinic acid or salt of the formula

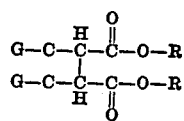

in either of which formulae at least one G represents alkenyl of from 6 to 16, both inclusive, carbon atoms, the other G independently represents hydrogen or alkenyl of from 8 to 16, both inclusive, carbon atoms and either R is independently hydrogen, ammonium or alkali metal. Thus, the half salts are herein included, as salts.

The substituted succinic acids, salts, and anhydrides to be employed as active agent in the present invention are, in general, articles of commerce or are made by procedures substantially identical with those employed in manufacturing the articles of commerce, such as the reaction of an olefin with maleic anhydride, followed by, if desired, hydrolysis, or neutralization or both.

The position in the alkenyl chain of the ethylenic unsaturation that is characteristic of alkenyl moieties is not critical. The invention is practiced successfully when employing an isomer in which the ethylenic position is precisely known and the purity is high; results when using such pure materials, in the present invention, are essentially indistinguishable from results obtained when employing industrial mixed isomers in which location of the unsaturation is not known. Also, mixtures of alkyl and alkenyl substituted, and mixtures of anhydride, acid and salt, or any two of them, so long as adequate amounts of alkenyl succinic anhydride are supplied, work as well as pure materials.

Among the compounds that are articles of commerce and are usable in the present invention are the following: a mixed hexadecenylsuccinic anhydride represented by the manufacturer as being an isomeric mixture; a relatively pure 1-decenylsuccinic anhydride having a refractive index $n$ at 20° C. for the D line of sodium light of 1.4691; a mixed dodecenylsuccinic anhydride as a viscous liquid boiling at 180–182° C. under 5 millimeters mercury pressure absolute; a pure 1-dodecenylsuccinic anhydride as a crystalline solid melting at 38–40° C.; a 1-hexadecenylsuccinic anhydride melting at 59–60° C.; a tetradecenylsuccinic anhydride melting at 53–56.5° C.; and a 1,1,3,5-tetramethyl-2-octenylsuccinic anhydride, supplied as a viscous yellow liquid.

Other substances equally adapted to be used include octenyl succinic anhydride and didodecenylsuccinic anhydride.

Any of the foregoing can, if desired, be hydrolyzed to obtain the corresponding acid, and, if desired, neutralized with ammonia or an alkali metal hydroxide or the like to obtain a corresponding salt and the resulting product used successfully in this invention. The sodium salt is preferred as least expensive, but the lithium and potassium salts can also be used. Representative such succinic acid compounds include 1-hexadecenylsuccinic acid, melting at 69–71° C. and the other homologues within the indicated scope.

The aggregate to be used in a concrete of this invention may be any good aggregate for concrete of the prior art. Such aggregate is inclusive of natural sand and gravel, from stream beds, terraces, flood plain deposits, alluvial fans and cones, marine deposits, glacial deposits, crushed, quarried bedrock materials, talus, coral, blast furnace slag; such light-weight aggregates as pumice, volcanic slag (scoria), or volcanic cinders.

Also such manufactured light aggregates as expanded shales, clays, slates, slags, and clinkers, and perlite, expanded vermiculite, and foamed glass are of value as aggregates to be used in this invention.

In one aspect, the aggregate is earth soil. The soil type is not critical, and the locale of the soil treated according to the present invention is not critical. It is assumed that such soils will at least part of the time contain some natural soil moisture. The soil can be exposed, or exposed in part, as a steep embankment adjacent a cut through a hill, where it is desired to control gulleying and washing of soil; it can be buried as under the foundation of a building or beneath a paved road; it can be in a situation normally exposed to high water table as in the earth behind rip-rapping along a river bank; or earth fill surrounding a stone well. The modified soil can be buried at a more or less uniform depth of from about 4 to about 120 inches, typically about 18 inches, beneath the surface of an agricultural soil, where it can function as a barrier to drainage, to improve retention of soil moisture. It can be cut into orderly pieces that are then used as building blocks; or such blocks can be preformed in molds of desired shape and size. Such blocks can then be used for paving, rip-rapping in structural walls, and the like. The location and exposure of the soil treated according to the present invention are matters essentially of indifference in the present invention.

The rock-like mineral aggregate concretes of this invention are of special advantage as an exposure-surface layer of, or to constitute the whole mass of, a concrete article including such structures as highways, bridges, docks, wharfs, pillars and supports therefor, curbs, sidewalks, dams, ramps, tunnel and shaft liners, barges and decks therefor, footings and foundations, retaining walls, and masonry structures of various types.

The advantageous properties of all aspects of this invention pertain especially to withstanding the degradative effects of brines, including sea water, sea water diluted with terrestrial surface water as in the waters of major bays; mineral well brines, brines artificially formed by the use of calcium and sodium chlorides and similar ionic saline materials in control of snow and ice, and the like.

The moistening or wetting of a dry mixture of this invention calls for the use of water. Such water and its use follow the prior art, as to purity, quantity, temperature, manner of addition and the like, and good prior art practice is of use here.

Components employed in the present invention are used in practice whether naturally moist, air dry, or oven dry. However, for uniformity, all weights stated herein, unless otherwise stated, are oven dry weights. "Oven dry" implies drying according to "Procedures for Testing Soils" (American Society for Testing Materials, Philadelphia, 1958) p. 102, 103, method D–698–57T. The oven is thermostatically controlled at 110° C.±5° C., for 24 hours, under atmospheric pressure, with constant change of air. Further drying results in no further loss of weight.

The substituted succinic anhydride or acid or salt may be incorporated into the other components of the hydraulic cement mixture in any convenient way. In one manner, the dry active agent is first dispersed in the dry cement (or burned lime or the like) before it is admixed with the aggregate. In another way, the active agent is first dispersed in water and the water used to moisten a mixture of aggregate and cement. In another method, the active agent is distributed, dry or in aqueous or other dispersion, over the aggregate, notably when it is an area of soil and worked into the soil with tillage instruments, and the cement additive applied thereafter. Other methods can be used. However added, the active agent is to be added so as to be distributed essentially uniformly and at approximately the time the mixture of all components of the present invention is prepared and compacted or otherwise finished for use throughout so much of the entire mass as is to represent the advantages and benefits of this invention.

Compositions of the present invention comprising active agent in an amount less than about 0.025 percent by oven dry weight of cementitious materials have upon hydration and setting, properties that differ only marginally from those of hardened hydraulic cement materials with no active agent. Compositions of the present invention comprising active agent in an amount greater than about 5 percent, same basis, have little or no advantage over compositions containing 1 percent or somewhat less. Good results are obtained from compositions comprising 0.25 percent active agent by dry weight of cementitious material. Good results are obtained when using 0.003 percent active agent by weight of oven dry non-water components. Thus preferred amounts of the active agent are from about 0.025 to about 0.25 percent by weight of cement. Amounts of portland cement of from 2 to 16 percent by oven dry weight of soil give excellent results.

In some situations, it will be preferred to incorporate the active agent alkenyl succinic acid compound into the composition after the material has been brought to a structural shape or form or position; and in many situations it is impossible to incorporate the active agent into the structural composition beforehand.

Thus, when desired, the active agent is readily dispersed in a liquid dispersant, which is usually most conveniently a solvent within which the active agent is dissolved; and such dispersion, which can usually be a solution, is applied as spray, swab, wash, dip, or the like to an outer surface of the structure made from the cementitious material while oftentimes such structure is in the shape of a slab, floor, pediment, cornice, pedestal, relief, statue, decorative carving, pillar, capital, buttress, muntin, mullion, tympanum, or the like. In the instance of such disposition of structures as calls for subsequent finishing, such as, for example, the grinding and polishing of a terrazo surface, it is much preferable to complete such finishing before applying composition comprising essentially an active amount of an active agent according to this invention.

When applying active agent of this invention from solution or the like, water can be used as solvent if desired. However, better penetration of the surface of a structure is obtained when using a preferred organic solvent. A preferred organic solvent is one that is characterized as being essentially without humectancy, having no hydroxyl groups, readily and completely volatile, of low surface tension, adequately effective as solvent for the active agent, and, in many applications for esthetic reasons, absence or substantial absence of color of its own, toxicity and flammability within tolerable levels, and acceptable odor if any.

Thus, the lower alkanols are not to be employed, the glycols and glycerine are also contraindicated.

Solvents that give excellent results include acetone, 1,1,1-trichloroethane (which can be corrosion-inhibited as to metal containers and the like, if desired) any of various light to medium boiling mineral spirits, various volatile paint and lacquer thinners, toluene, benzene, xylene, the solvent esters such as amyl acetate; most of the lower alkyl ketones including methyl ethyl ketone, methyl isobutyl ketone, and so forth. Also dichloromethane, trichloromethane, 1,2 - dichloro - 1,1,2,2 - tetrafluoroethane, monofluorotrichloromethane, and the like.

On the inventors' experience to this time, the most preferred solvents include water, 1,1,1-trichloroethane, and light mineral spirits.

In applying active agent in solution in nonaqueous solvent, preferred practice will be to apply solvent solution to dry or substantially dry composition to be treated, whereby solvent can penetrate to a maximum depth, permitting solvent to disappear, largely by spontaneous evaporation, and thereafter exposing the resulting treated composition to water vapor. Water, in some way, appears to be necessary to cause, or permit, some necessary interaction between active agent and the alkaline earth metals of the cementitious material; and better results appear to be achieved when first water contact following treatment is with water in vapor phase. However, this is not critical, good results being obtained when water is brought into liquid phase contact with treated composition.

It is noted that the necessary water contact is made simultaneously with any first exposure of treated composition to water-involved degradative influences.

Also, it is sometimes preferred to apply solvent solution of active agent as a two-phase, or polyphase emulsion or suspension. In this situation, either organic or aqueous may be the continuous phase, and the other the discontinuous phase; and usually active agent will tend to partition between the phases as a function of its relative solubility in each. Thus, each phase functions in such polyphase dispersion. Evidently, then, it is immaterial whether such dispersion be thought of as a solution, or as two solutions, or as an emulsion. This is of value particularly when employing an invert emulsion of relatively enhanced viscosity; that is, an emulsion in which an organic phase, such as a phase based upon a petroleum fraction, is the continuous phase.

Other materials have been employed as additives to, particularly, portland cement and its mortar compositions. Among these are calcium stearate, oleic acid; various aqueous latexes of organic polymers, and so forth. These can be used in, or in conjunction with, their known applications in cement, concrete, mortar, lime, plaster, and the like, as heretofore, while the present invention is practiced conjointly therewith.

Among the particular embodiments contemplated according to this invention are the modification of gypsum plaster including its form as "patching plaster," and its form as a paper-covered and at times glass-fiber-reinforced central core in a wallboard or mineral lath or underlayment for mineral lath; the hydraulic cement vehicle for holding stucco in its various forms in place in a structure; fabric-reinforced casts of plaster of paris (kilned calcium sulfate) for surgical and related uses especially where degradation from aqueous liquids is a foreseeable problem; plaster models of statuary intended to be recast in bronze; clays and argillaceous earths modified by addition of calcium compounds: and interior cement mortars of the magnesium oxychloride type.

The following specific examples illustrate the best modes of practicing the present invention.

DESCRIPTION OF THE PREFERRED EMBODIMENTS

Example 1

With thorough mixing and stirring together, 1020 grams of an air dried silt loam soil (979.3 grams, oven dry basis) were intimately combined with 68.5 grams dry portland cement. Mixing and stirring were continued as the soil-cement mixture was brought to a desired moisture content (presently, 18.5 percent) by spraying with 153 grams water. When the mixture was uniformly moist, twelve aliquots each of 85 grams were taken, and, in a molding tube 30 millimeters in diameter, were compressed from both ends in a hydraulic press until dimensional stability was attained under pressure of 51.8 kilograms per square centimeter (740 pounds per square inch). There resulted from each of the twelve aliquots so treated, a firm, self-supporting cylinder. The cylinders were placed in an atmosphere of 100 percent relative humidity at room temperature to hydrate and cure. This procedure yielded twelve cylinders, each 3 by 6 centimeters, containing portland cement in the amount of approximately seven percent of the oven dry weight of the soil. These were regarded as the untreated check samples, and are hereinafter called "Group 1."

Promptly upon completion of the preparation of the check samples, essentially the same process was repeated except that the water applied as a spray contained n-decenylsuccinic anhydride in the amount of 0.25 percent of the oven dry weight of employed soil. The twelve resulting test cylinders, of appearance essentially indistinguishable from those, foregoing, were placed to cure with the test cylinders. This group is hereinafter called "Group 2."

The process was repeated except that the n-decenylsuccinic anhydride was employed in the amount of 0.1 percent by weight of oven dry soil, and the resulting cylinders hereinafter called "Group 3."

The process was again repeated except that the n-decenylsuccinic anhydride was employed in the amount of 0.025 percent by weight of oven dry soil, and the resulting cylinders hereinafter called "Group 4."

Each group of cylinders was identified for later reference, and maintained under 100 percent relative humidity to cure, for seven days.

At the end of the seven day curing time, random representative cylinders, four from each different group, were removed and air dried for 24 hours, and thereafter immersed in water for 24 hours. Following the 24 hours water immersion, each group was tested for unconfined compressive strength (UCS).

The present and all other Unconfined Compression Strength tests were carried out in a standard, commercial unconfined compression strength tester. In the tester, the cylinder is positioned with its flat ends horizontal, one resting on, and the other supporting, a pressure plate with a strain gauge actuated by deformation of a proving ring to indicate pressure between the plates. A screw mechanism with mechanical drive closes the distance between the pressure plates at a predetermined rate, presently 0.05 inch per minute.

In tests of materials such as the present cylinders, pressure between the plates rises more or less linearly until shear begins to occur within the cylinder material, at which point the rate of pressure rise declines. This is usually soon followed by the collapse of the cylinder of tested material, ideally into cones one with a base on each pressure plate, meeting, or approximately meeting at a midpoint of the imaginary axis of the original cylinder. The pressure reading between the plates collapses immediately to zero, thus affording a satisfactory end point. The highest pressure attained before such collapse is regarded, for purposes of the present tests, as the unconfined compressive strength of the material: being a point beyond incipient shear it might not be a satisfactory norm for engineering design.

In the present example, the results obtained were as follows:

TABLE 1

| Group: | UCS, as kg./cm.² |
|---|---|
| 1 | 16.59 |
| 2 | 28.35 |
| 3 | 27.93 |
| 4 | 26.74 |

Example 2

With intimate mixing and stirring together, 425 grams of an air dried silty clay soil (408 grams, oven dry basis) was intimately mixed and blended with 12.25 grams (3 percent of dry soil weight) of commercial burned lime of high calcium content, 98 percent calcium oxide. Mixing and stirring were continued as 72 grams water were sprayed on to the mixture, and a uniform moist mixture was achieved.

Aliquots of the resulting mixture were molded under hydraulic pressure exactly as described in Example 1, to obtain cylinders approximately 3 centimeters in diameter and 6 centimeters in axial length. The test cylinders, regarded as checks, untreated, are hereinafter identified as "Group 5."

The process was repeated except that the water sprayed on to the lime and earth mixture contained an amount of n-decenylsuccinic anhydride equal to 0.1 weight percent of oven dry soil (0.41 gram).

The resulting cylinders are hereinafter identified as "Group 6." The cylinders of both groups were double wrapped in aluminum foil and held for 10 days at 60° C. to cure.

Upon completion of the curing period, representative cylinders from each group were unwrapped, removed from the curing oven, and air dried for 24 hours, then immersed in water at room temperature for 24 hours and thereafter tested for unconfined compressive strength. The results obtained were as set forth in the following table:

TABLE 2

| Group: | UCS, as kg./cm.² |
|---|---|
| 5 | 19.95 |
| 6 | 24.78 |

The results are closely comparable when employing the monosodium or disodium salt of n-decenylsuccinic acid, in the manner here described to be used with the n-decenylsuccinic anhydride.

Example 3

Essentially the procedures of Example 1 were repeated, except that the additive, portland cement was employed in the amount of 4 percent by oven dry weight of soil. Samples were prepared with no active agent (hereinafter Group 7) and with 0.13 percent tetradecenylsuccinic anhydride by weight of oven dry soil, hereinafter Group 8. The resulting test cylinders were cured for 7 days at 100 percent relative humidity, air dried for 24 hours, and then immersed in water at room temperature for 24 hours, and thereafter tested for unconfined compressive strength, in the manner hereinbefore described.

The results are as set forth in the following table:

TABLE 3

| Group: | UCS, as kg./cm.² |
|---|---|
| 7 | 5.46 |
| 8 | 7.07 |

Example 4

A parking lot in an area of sandy loam soil is improved according to the present invention, all operations being carried out in early summer. The soil is first tilled uniformly to a depth of six inches, measured from the original, undisturbed soil level. Portland cement is uniformly spread over the tilled surface in the amount of 42.3 pounds, average, per square yard.

The soil is then watered with an amount of water calculated, with allowance for natural soil moisture present, to bring the moisture content of the soil, to tillage depth, to 14 percent moisture, total. The water added contains, dissolved, as active agent, disodium octenylsuccinate in an amount sufficiently to supply 0.25 pound of active agent per square yard. Application of water without active agent is made, at the same water rate, to a marginal area maintained as a check. The soil is then again vigorously tilled with a rotary tiller to achieve thorough mixing together of the soil, portland cement, water, and active agent, to the original tillage depth. The area is thereafter leveled with a grader blade, compacted by repeated passages of a sheepsfoot roller, and finished with a smooth roller. The area is thereafter maintained free of traffic for a week, as the soil mixture cures and attains strength. It is thereafter put into use.

In compression tests applied after a heavy rain several weeks later, a plug drilled as a core from the main parking lot area is found to exhibit approximately twice the unconfined compressive strength of a similar core taken from the marginal area not treated with the active agent.

Example 5

A greased rectangular wooden mold is provided, 22 inches long, 18 inches wide, 10 inches deep, within. The size is intended to represent 24 x 18 x 12 with an inch mortar joint allowance.

It is neatly filled with a composition of Group 2, Table 1, Example 1, foregoing. The material is permitted to cure and is then pressed out. The process is repeated to obtain a supply of blocks adequate for the construction of a test building.

As foundation footing, the earth is prepared according to Example 4, foregoing. It is graded to provide drainage away from the building in all directions.

Using standard broken joint construction characteristic of the laying of unreinforced concrete block walls, with further composition of Group 2, Table 1, Example 1, freshly prepared, as mortar, a building 10 feet square is laid up with walls 9 feet high, with a 3 foot by 4 foot window opening in each of two walls and, by sawing blocks with a masonry saw as necessary, a door opening 30 inches by 84 inches in a third wall. Over these openings, standard quarter inch by 3 x 8 T-iron lintels are provided. The wall is plastered with hydrated lime plaster inside, outside, and on top. When the plaster is partially set, a 2 x 12 plate is embedded in it on top of the wall, encircling the wall, and flush with its outer surface. Two x four collar beams are provided, to span the top opening and, cooperating with the collar beams, rafters are erected, meeting at facing tops and without ridgepole. Over the rafters a roof deck of ⅜ inch plywood is laid. The rafters and deck extend beyond the walls they overhang for 24 inches on each side, and the roof is swung by cantilever of the unsupported plywood finished with a 2 x 4 fales rafter, to extend 24 inches beyond the wall at each end.

Steel casement windows are fixed into the window openings and a door frame and door into the door opening. Remaining surfaces are then caulked with further freshly prepared composition as used for mortar, and it, too is plastered over.

The biulding is exposed to ambient weather in climate in a wet region near the 30th parallel, north latitude. After two years with about 120 inches of rainfall, total, it shows no evidence of structural impairment or weakness.

Example 6

This example substantially repeats that, foregoing, except that the four walls of the building are built each with a different kind of block. The blocks are like those, foregoing, except that, in each case, approximately half the earth, by volume is removed from the block-making material and replaced, equal volume with, in one wall sawdust, in a second wall ground Styrofoam polystyrene foam, in a third wall foamed slag, and in the fourth wall coarsely ground bagasse. The blocks are well compacted, in each case, by vibration; but they are not formed under high mechanical pressure.

To the workman erecting the walls, the blocks in this example are all conspicuously lighter in weight than those in the foregoing example. At the end of the two-year observation period, the building of this example, and each of its four walls in particular, appear in tact, free from evident deterioration.

The following examples were carried out in series.

SERIES I

Various cured, solid, neat cement plugs were prepared by preparing a slurry of water and neat cement and, in one sequence of the series, adding n-decenylsuccinic anhydride in the amount of 0.25 and in a second sequence in the amount of 0.50 parts by dry weight of portland cement and thereafter curing in disposable cups. These sequences involved various levels of water-to-cement weight ratio. The resulting plugs were aged for 28 days at 100 percent relative humidity, for 14 days at 50 percent relative humidity, then weighed, and thereafter immersed in water for 28 days and thereafter reweighed, and weight gain from water absorption calculated as percent of original weight. The results were as set forth in the following table.

TABLE 4

| Example | Percent n-decenylsuccinic anhydride | Water-to-cement ratio— | | | | |
|---|---|---|---|---|---|---|
| | | 0.25 | 0.32 | 0.34 | 0.35 | 0.43 |
| | | Percent water absorbed, 28 days | | | | |
| 7 | None | 7.2 | 7.8 | 8.15 | | 11.7 |
| 8 | 0.25 | 4.2 | 4.8 | 7.85 | | 10.3 |
| 9 | 0.50 | 3.9 | 4.25 | | 5.95 | 9.2 |

The amount of water absorbed by the untreated samples is clearly greater at all proportions of water/cement employed but that the most effective performance of the invention was at the lower water/cement ratios. It is well known that, for most uses, the richer or more highly concentrated cement slurries are preferred because of the greater compressive strength values and the lower permeability. This emphasized the importance of a low water/cement ratio as the conditions of freezing become more severe. Only sufficient water is recommended to be used to insure adequate manipulability and subsequent hydration of the cement.

The water/cement ratio is not highly critical, but observation of properties of the slurry and set cement of the invention indicate that a ratio of 0.316 typifies a practical utilitarian ratio having excellent fluidity and adequate strength properties and will usually be used hereinafter. However, such ratio is merely as illustrative and any ratio of 0.25 to 0.60 is acceptable.

SERIES II

In this series, the samples were prepared, as in Series I, but all having a water/cement ratio of 0.316. Four groups of tests were conducted on the samples representing levels of n-decenylsuccinic anhydride of 0.10, 0.25, 0.50, and 0.75 percent expressed as in Series I. Each group was tested as to weight gain after 28 days total immersion in, respectively, water, 10% NaCl brine, and 10% $CaCl_2$ brine. The results obtained are set forth in Table 5.

TABLE 5

[Percent weight gain of neat cement at various ASA levels from absorption of water and brines, 28-day immersion]

| Example | Immersion liquid | n-Decenylsuccinic anhydride as percent of dry cement— | | | | |
|---|---|---|---|---|---|---|
| | | 0 | 0.10 | 0.25 | 0.50 | 0.75 |
| | | Percent weight gain per plug | | | | |
| 10 | Water | 7.6 | 5.7 | 4.45 | 5.2 | 5.7 |
| 11 | NaCl, 10% | 7.4 | 5.2 | 3.25 | 3.1 | |
| 12 | CaCl₂, 10% | 6.7 | 2.9 | 2.1 | 2.25 | 2.15 |

Reference to Table 5 shows that as the amount of additive is increased from none to 0.25 part, based on 100 parts dry weight of cement, the amount of immersion liquid absorbed decreases markedly but thereafter there is little change in the amount absorbed, except, in the case of water, the amount absorbed actually increases to a measurable extent as the amount of additive is increased above 0.25 percent by weight of the dry cement. However, the amount absorbed is still about 2% lower in absorption than in the untreated cement.

SERIES III

This series of tests was run to show the effect of alternating 24-hour periods at a temperature of 0° F. and 48-hour periods at room temperature (about 75° F.) in air on four groups, comprising aqueous neat cement samples as follows: one group was prepared according to the invention, containing 0.1% of n-decenylsuccinic acid anhydride and designated Example 13, and three groups designated Examples 14, 15 and 16. The group of Example 14 and groups of Examples 15 and 16 consisted of samples containing 0.25 and 0.50% oleic acid, respectively, according to known practice in prior art attempts to lessen water absorption. Water was used, as above, in this series of tests in a water/cement ratio of 0.316.

The tests were conducted by preparing examples as in Series II above except the procedure was modified as necessary to include the variations in the type and amounts of additives employed according to each group of tests in this series. The poured samples, upon setting and curing, as indicated, were weighed and thereafter immersed in 10% CaCl₂ brine, removed therefrom, reweighed, and then subjected to the cycles of a freeze-thaw test, which test consisted of subjecting the samples containing absorbed CaCl₂ at alternating temperatures, of 0° F. for 24 hours and room temperature (75° F.) for 48 hours for 10 cycles, each full cycle, therefore, lasting 72 hours. The samples being tested were carefully examined after each cycle for scaling and spalling. The results are shown in Table 6, which shows percent brine absorbed, and the number of cycles of the freeze-thaw treatment. The type of cement treatment is identified by Example number, foregoing.

TABLE 6

| Cement treatment (See text) | Number of 72-hour freeze-thaw cycles— | | | | | | | |
|---|---|---|---|---|---|---|---|---|
| | 0 | 1 | 2 | 3 | 4 | 5 | 6 | 7 | 10 |
| | Percent CaCl₂ brine absorbed | | | | | | | |
| Example: | | | | | | | | |
| 13 | .8 | .95 | 1.2 | 1.5 | 1.6 | 1.65 | 1.7 | | 2.0 |
| 14 | 7.15 | 7.9 | 8 | 8.05 | 8.05 | 8.1 | | .2 | 8.25 |
| 15 | 5.2 | 5.6 | 5.8 | 5.9 | 5.95 | 5.95 | | 5.95 | |
| 16 | 3 | 3.1 | 3.45 | 3.9 | 4.0 | 4.1 | | 4.15 | 4.6 |

Reference to Table 6 shows that the untreated samples and those treated with oleic acid, both by admixture thereof with the aqueous cement slurry and by application of a solution thereof to the exterior of the set cement sample absorbed appreciably greater amounts of the brine (although the oleic acid-tested samples showed some improvement over untreated) in comparison to the relatively low percent of absorption manifested by the samples prepared according to the invention. Visual examination of the various cement samples following each freeze-thaw cycle showed progressive increased spalling and decay of the cement of those samples which were untreated and to a lesser extent of those treated with oleic acid but almost no spalling in the samples prepared according to the invention.

SERIES IV

In this series of tests, nine aqueous portland cement test slurries, of a ratio of water/cement of 0.316, were prepared. The test compositions consisted of three groups of three tests each: Tests in Examples 17, 18, and 19, they consisted of cement and water only; in Examples 20, 21, and 22 they consisted of cement, water, and 0.25% by weight of oleic acid; in Examples 23, 24 and 25 they consisted of water, cement, and 0.25% by weight of n-decenylsuccinic anhydride (i.e., ASA). Specimens of each numbered test were poured and cured alike. One test specimen of each group, Examples 17, 20, and 23, was immersed in water; a second test specimen of each group, Examples 18, 21, and 24 was immersed in 10% by weight NaCl brine; the third test specimen of each group, Examples 19, 22, and 25 was immersed in 10% by weight CaCl₂ brine.

The purpose of this series was to show the relative results obtained when neat cement samples are immersed in various aqueous media to ascertain the extent of absorption and consequential effects after 56 days immersion. The results of these tests are as set forth in Table 7.

TABLE 7

| Example numbers (See text for composition and treatment) | Absorption time in days— | | | |
|---|---|---|---|---|
| | 1 | 14 | 28 | 56 |
| | Water or brine absorption wgt. percent of specimen | | | |
| 17 | 6.8 | 7.2 | 7.6 | 8.3 |
| 18 | 6.3 | 6.95 | | 8.1 |
| 19 | 5.9 | 6.5 | 6.75 | 7.15 |
| 20 | 5.6 | 6.0 | | 6.95 |
| 21 | 5.3 | | 6.3 | 7.0 |
| 22 | 4.85 | 5.1 | 5.6 | 6.3 |
| 23 | 2.5 | 3.95 | 4.7 | 5.0 |
| 24 | 1.7 | 2.6 | 3.15 | 3.8 |
| 25 | 0.8 | 1.6 | 2.05 | 3.1 |

Reference to Table 7 shows that those compositions reported in Examples 23–25, employing the alkenyl succinic acid anhydride according to the invention absorbed less water or brine than those employing oleic acid as the additive or those wherein no additive to lessen absorption was used.

SERIES V

This series of tests was conducted to show the effect of a test wherein dry, and brine-wet periods in successive cycles were alternated to compare untreated samples with samples containing an alkenyl succinic acid anhydride, as illustrative of the practice of the invention. The tests involved preparing and curing neat cement samples as in the foregoing series of tests, two, designated Examples 26 and 27, were untreated, i.e., contained no additive for comparison purposes, and two, designated Examples 28 and 29, contained 0.25%, by weight of the composition, of n-decenylsuccinic acid anhydride. Each sample was subjected to a cycle beginning with 48 hours in dry air at a room temperature of 75° F. Thereafter those of Examples 26 and 28 were immersed in 10% by weight NaCl brine and Samples 27 and 29 were immersed in 10% by weight CaCl₂ brine. Each such cycle was repeated 16 times. Selected percentage absorption figures obtained are reported in Table 8.

TABLE 8

[Absorption from brine wet-dry cycles]

| Example numbers (See text for composition, method and immersion liquid) | Number of wet-dry cycles— | | | | | | | |
|---|---|---|---|---|---|---|---|---|
| | 1 | 2 | 3 | 4 | 5 | 7 | 11 | 16 |
| | Brine absorbed, weight percent of sample | | | | | | | |
| 26 | 3.5 | 3.7 | 4.0 | | 3.95 | 3.9 | 4.2 | 4.4 |
| 27 | 2.5 | 2.0 | 2.0 | | 3.1 | 4.5 | 4.5 | 4.6 |
| 28 | 1.05 | 1.05 | 1.15 | 1.1 | 1.0 | 0.9 | 0.2 | 0.1 |
| 29 | 0.6 | 0.2 | 0.1 | | −0.3 | −0.25 | −0.3 | −0.8 |

The table indicates that absorption of brine under these test conditions was significantly less in the samples prepared with n-decenylsuccinic anhydride in the amount of 0.25% than in the untreated checks. Also, in the calcium chlorine brine the sample underwent an absolute loss of weight indicating, possibly, transfer of unbound water from the cement sample to the brine; or possibly a loss during the dry phase of each cycle not recovered during the wet phase.

SERIES VI

In this series, samples of concrete were prepared, employing a water-cement-sand ratio of 0.515–1–2.75, respectively, each sample but one modified by an additive. The samples were prepared in disposable cups and cured, the cups removed and the samples thereafter air dried, weighed, immersed in water for 56 days, reweighted, and gain of weight of absorbed water calculated.

The mixtures employed, and the percent weight gain measured were as follows:

TABLE 9

| Example | Amount as percent dry cement and composition of additive | Immersion time, days— | | | | |
|---|---|---|---|---|---|---|
| | | 1 | 3 | 14 | 28 | 56 |
| 30 | None | 3.9 | 3.0 | 4.0 | 4.1 | 4.15 |
| 31 | 5% oleic acid post treatment | 3.45 | 4.0 | 4.15 | 4.25 | 4.35 |
| 32 | 0.25% calcium stearate incorporated | 2.85 | 3.3 | 3.5 | 3.6 | |
| 33 | 0.25% ASA incorporated | 1.85 | 2.1 | 2.6 | 2.7 | |

Only Example 33 is illustrative of this invention. Water absorption in the example is conspicuously lower than in the three parallel prior art examples.

Example 34

The instant invention is tested in the resurfacing of the deck of a concrete surface bridge that conveys a motor vehicle highway across a railroad track, a river, and part of a flood plain adjacent the river, the deck being recurringly exposed to rain, ice, and snow-control salts.

The repair is to be carried out according to good, modern techniques. In surface preparation, all areas are scarified to remove at least ¼ inch of surface and with it all oil pan drippings and anti-spalling oil; seriously damaged surface spots are cleaned to the depth of sound material; reinforcing rods are cleaned or replaced, as indicated; regularly cut walls are provided to replace irregular walls of cracks; and all areas to be repaired are cleared to ½ inch below screed line. All wet saw slurry is removed, and, immediately before placement of the modified hydraulic cements the surface is air- or sand-blasted to leave a clean surface; the clean surface is then soaked with clean water for an hour and at that juncture, at a temperature between 45 and 85° F., placement of repair concrete is begun.

Over about half the bridge surface, from the expansion joint at one approach to the expansion joint nearest its mid-length point, is surfaced in approved manner with a patching cement of superior characteristics prepared by the recipe

| Component | Quantity |
|---|---|
| Portland cement, class I | lbs__ 94 |
| Sand | cu. ft__ 2.5 |
| Crushed stone | cu. ft__ 2.0 |
| Latex [1] | gallons__ 3.5 |
| Water [2] | do____ 3.5 |

[1] The latex is a styrene-butadiene latex, 46–49 percent solids by weight of latex, poststabilized with nonionic surfactants and of a pH of 10–11.
[2] Amount of water adjusted to give a finished actual total water/cement ratio of 0.35–0.4, allowing for aggregate moisture, etc.

The prepared concrete to be repaired is, in every instance, surface-brushed to assure intimate contact of at least the slurry fines with all exposed surfaces to receive the repair: at once thereafter and before any surface drying, the bulk of the concrete is deposited and is struck off to about ½ inch above final grade, consolidated with vibrating screeds, and hand-finished with a wooden float.

The resulting surface is textured by transverse strokes of a palmetto broom; at a suitable time screed rails and construction dams are removed, and, upon formation of a surface latex film and as soon as the concrete will support necessary weight, the surface is covered with two layers wet burlap one after the other; and these are maintained wet without drainage for 24 hours, when they are removed.

From the other approach expansion joint to expansion joint at about midpoint line, the same procedures are followed except that, in solution in the water added to regulate total water/cement ratio is added the sodium salt of dodecenylsuccinic acid in the amount of 0.25 percent by dry weight of non-latex concrete components.

From the entire area, traffic is barred for 96 hours, whereupon service is restored.

Examination of the repaired bridge deck after two year's service reveals that both repaired areas are of surfaces superior to those of conventional concrete adjacent the bridge approaches; but that spalling and incipent spall cracks are more abundant in the area prepared without the sodium dodecenylsuccinate: the ratio is about 18 spalled areas or well-defined spall cracks in the area prepared without, to about 10 spalled areas or spall cracks in the area prepared with the sodium dodecenylsuccinate.

Example 35

A mortar mixture is prepared, of a dry, commercial magnesium oxychloride cement powder which is composed of approximately equal weights of magnesium oxide (light burn) and magnesium chloride, together with silica sand in the amount of twice the weight of oxychloride cement powder. To this mixture water is added, sufficient to render it plastic; and it is then promptly applied as a cement to bind a slate floor to a prepared underfloor.

The underfloor is of clean, sound plywood, swabbed with a commercial pentachlorophenol wood preservative solution, covered with builder's asphalt-impregnated felt paper that is secured conformingly into place; and over it at a distance of about ⅛ inch above the asphalted paper, expanded metal lath. The slate is pre-cut, clean, and moist.

In prompt procedures following the addition of water to the cement powder, a cement base is laid down upon, and trowelled into and through the metal lath, and the upper surface struck off uniform.

Upon the mortar surface, present slate is bedded in, and the joint spaces between the pieces are nearly filled with further cement. Joint surfaces are wiped to achieve uniformly struck finished joints. The cement is permitted to harden during a week, as the mortar is kept moist.

Thereafter, mortar joint surfaces are permitted to evaporate to dryness in air, and the present invention is applied to part of the slate-paved area.

In more particular, a solution is made, of mixed alkenylsuccinic acids, notably hexadecenylsuccinic with an unassayed, small fraction of tetradecenylsuccinic acid, at a concentration of 5 percent by weight of solvent, in 1,1,1-trichloroethane.

The oxychloride cement mortar joints are left exposed as adjacent slate is covered with pressure-sensitive masking tape and paper. Over the exposed joints the ASA solution is applied as a cone spray under air pressure to the point of incipient wetness. By penetration and evaporation the surface wetness quickly disappears. The ASA solution is permitted to dry during two days during which the cement further hardens. The joints are then water wetted and allowed to stand a day, and then tested.

Representative joints are found to be in tact, when challenged by hammering firmly with a fist, in both treated and untreated areas. All of the slates were attached and none is detached.

A mop-water is prepared, of a sodium linear alkylbenzenesulfonate in the amount of about 0.1 weight percent of mop-water, together with about 0.2 weight percent water-soluble glassy sodium polyphosphate, and 0.1 weight percent 3,4,4'-tribromosalicylanilide as germicide.

The mop-water is applied to portions of the treated and untreated areas of the slate floor, used in a scrubbing operation, and largely removed therefrom, during 10 repeated passes by a commercial wet vacuum cleaner with floor brush engaged.

Thereafter, the resulting scrubbed surfaces are examined for visible effect, if any, of the wet vacuum cleaning of the treated and untreated areas.

In the unscrubbed areas, the mortar of the wiped mortar joints proceeds in a smooth curve from the wiped depths of the joint to approach abutting slate edges smoothly, disappearing at infinitesimal thickness at or near the upper edge of the slate flooring pieces. The same situation prevails in the treated, scrubbed area.

Example 36

In this example, active agent is sodium hydrogen n-decenylsuccinate; it is employed by admixing it with dry, unhydrated, powdered gypsum (i.e. Plaster of Paris) having reinforcing glass fibers therethrough in an amount equal to 0.15 percent by weight of gypsum thereafter, working promptly and employing pilot plant equipment of the sort known in the developmental studies of the building materials industry, water in amount suitable to the orderly hydration of the gypsum is added thereto and promptly mixed thereinto, to obtain a briefly spreadable, rapidly hydrating paste. This is mechanically spread and doctored smooth over an unrolling heavy paper; a second heavy paper is unrolled over the doctored surface of the gypsum paste and pressed against it by roller, to obtain an incompletely cured gypsum wall broad modified according to this invention. The resulting board is carried on a slowly moving fabric belt over a period of an hour to achieve preliminary cure and is thereafter dried at gentle oven heat.

The resulting board is compared with a gypsum board of the prior art by employing one board of this invention and a board of the prior art identical except employing no ASA, in exterior building construction in a geographic region characterized by annual rainfall of about 36 inches. In this climate the boards, mounted side by side and given essentially identical weather exposure are left without protection of any kind to ascertain their apparent serviceable lives.

What is claimed is:

1. A composition of matter adapted to be cured upon hydration to obtain a solid consisting essentially of a cementitious material and from 0.025 to about 5 parts per 100 parts of said material of an alkenyl succinic acid, an alkenyl succinic anhydride or a mixture thereof wherein each alkenyl substituent is an independently selected alkenyl group of from 6 to 16 carbon atoms.

2. Composition of claim 1 wherein the cementitious material is a hydraulic cement.

3. Composition of claim 2 wherein the hydraulic cement is portland cement.

4. Composition of claim 3 wherein the composition is a mixture of earth soil and portland cement.

5. Composition of claim 3 wherein the composition is a mixture of mineral aggregate and portland cement.

6. Composition of claim 2 wherein the hydraulic cement is lime.

7. Composition of claim 6 wherein the hydraulic cement is a mixture of earth soil and lime.

References Cited
UNITED STATES PATENTS

| | | | |
|---|---|---|---|
| 3,335,018 | 8/1967 | Peeler et al. | 106—90 |
| 3,202,521 | 8/1965 | Lorenzen | 106—90 |
| 3,131,074 | 4/1964 | Thompson | 106—63 |
| 2,790,724 | 4/1957 | Bergman | 106—90 |
| 2,770,077 | 11/1956 | Smith | 47—58 |
| 2,491,045 | 12/1949 | Holmes | 106—94 |
| 2,113,375 | 4/1938 | Himsworth | 106—111 |

JAMES E. POER, Primary Examiner

U.S. Cl. X.R.

106—97, 98, 104, 107, 111, 117